United States Patent [19]

Todd et al.

[11] Patent Number: 4,522,588
[45] Date of Patent: Jun. 11, 1985

[54] HEAT REGENERATOR

[76] Inventors: Julian B. Todd, 72 Trafalgar Rd., Moseley, Birmingham; Roger J. Webb, 108 Purnells Way, Knowle, Solihull, West Midlands, both of England

[21] Appl. No.: 541,173

[22] Filed: Oct. 12, 1983

[30] Foreign Application Priority Data

Oct. 12, 1982 [GB] United Kingdom ............. 8229066

[51] Int. Cl.³ ................. F27D 17/00; F24H 1/00; F23D 11/44
[52] U.S. Cl. ................................. 432/181; 431/215; 432/219
[58] Field of Search ............ 432/180, 181, 219, 222; 431/161, 215, 216, 217; 165/9.2, 9.4

[56] References Cited

U.S. PATENT DOCUMENTS

| Re. 29,622 | 5/1978 | Lange | 432/180 |
|---|---|---|---|
| 2,785,212 | 3/1957 | Begley | 432/180 |
| 2,895,544 | 7/1959 | Parsons | 431/161 |
| 3,966,393 | 6/1976 | Takeuchi | 432/219 |
| 4,143,704 | 3/1979 | Kandakov et al. | 165/9.2 |
| 4,363,623 | 12/1982 | Brune | 432/219 |

Primary Examiner—John J. Camby
Attorney, Agent, or Firm—Larson and Taylor

[57] ABSTRACT

A heat regenerator for use in heating an enclosure such as a furnace.

The heat regenerator 51 is detachable at one end from a burner B and at its other end from a reversing valve 58. The regenerator 51 comprises two axially engaging portions 56 and 57, the front portion 56 comprising a cylindrical heat storage bed 59 and a surrounding annular layer 60 of a ceramic fibre insulation material. The rear portion 57 comprises a cylindrical body of refractory having a bore 61 forming a bottle-neck type passage tapering towards the valve 58. The heat storage bed 59 comprises a monolithic refractory block through which a multiplicity of axially aligned gas-carrying channels 65 extends. These channels 65 convey combustion products from the burner portion 52 to the regenerator portion 56 in one mode of operation where the bed is extracting heat from the products for storage. In another mode of operation the channels 65 convey air from the portion 56 to the portion 52 so that the air can be heated by the stored heat now released from the bed.

10 Claims, 8 Drawing Figures

HEAT REGENERATOR

The present invention relates to a heat regenerator for use in a heat recovery system with a burner particularly though not exclusively of the type described in the present application.

According to the present invention a heat regenerator is provided for use in a heat recovery system, the regenerator comprising a heat storage bed housed in a fluid-impermeable casing, the regenerator being detachable at one end from a burner and at the other end from a reversing valve.

Embodiments of the present invention will now be particularly described with reference to the following drawings in which.

Figure 1:
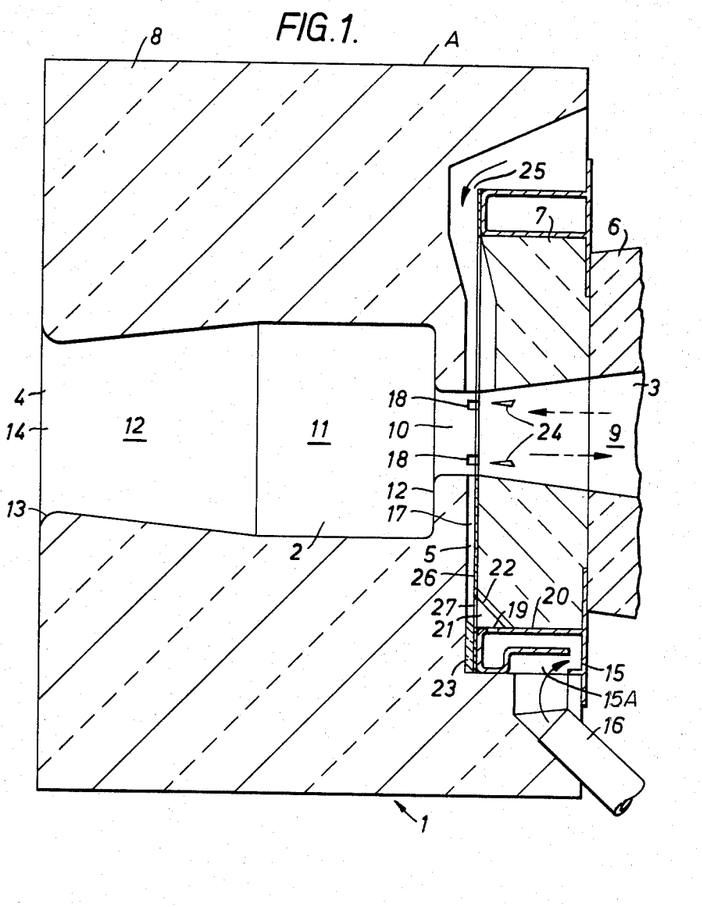
FIG. 1 is a sectional side view of one form of a burner suitable for use with the regenerator.

Referring to FIG. 1 the burner A comprises a body 1 with a through-going bore 2 defining a first end 3 to receive air, a second end 4 to discharge the combustion products of fuel combusted in the bore 2 and fuel inlet means 5 for delivering fuel to a point in the bore 2.

The body 1 comprises three adjoining portions 6, 7 and 8 in which the bore 2 is defined.

The first portion 6 comprises a refractory block which defines the first end 3 of the bore 2.

The second portion 7 comprises a refractory ring whose purpose will be described subsequently.

The third portion 8 comprises a refractory quarl block which is externally cylindrical and defines the second end 4 of the bore 2.

The bore 2 is provided with a conical portion 9 tapering inwardly from the first end 3 through both portions 6 and 7 to a point where the fuel enters the bore.

The bore 2 then has a substantially constant cross-section in a mixing chamber region 10 where the fuel and air mix. This chamber 10 is actually formed in the portion 8.

The third portion 8 is also formed with a wider cylindrical bore section 11 adjoining a conical bore section 12 which tapers inwardly towards the second end 4 of the bore 2.

The cylindrical section 11 is separated from the region 10 by an annular step 12 and forms a combustion chamber for fuel and air previously mixed in the mixing chamber 10.

The second end 4 of the bore 2 is formed with a radiussed portion 13 forming an inwardly tapering bore section 14 adjoining the conical section 12.

The ring 7 is externally cylindrical and circumventing the ring is an annular manifold 15 for supplying fuel, in this case natural gas, to the chamber 10 for mixing with incoming air. The manifold 15 is provided with an angled inlet tube 16 which extends outwardly from the ring 7. Fuel gas enters the manifold 15 by way of an inlet passage 15A formed in one portion of the manifold. Both the manifold 15 and the tube 16 are made of steel.

The manifold 15 communicates with the bore 2 by way of fuel inlet means 5 comprising several in this case, five, circumferentially spaced and radially directed ducts 17. These ducts 17 are formed between the ring 7 and the third portion 8 when these components lie adjacent each other. To this end the end face of the ring 7 is substantially flat while the end face of the portion 6 is provided with recesses or slots corresponding to the ducts 17.

The ducts 17 form inlet passages for the supply of fuel gas to the bore 2.

Only one duct 17 is shown in detail although the outlet ends 18 of two other such ducts 17 are shown in FIG. 1.

The manifold 15 is provided with outlet apertures 19 circumferentially spaced on the inner surface 20 of the manifold 15 and corresponding in number to the ducts 17.

The manifold outlet apertures 19 and the ducts 17 communicate with each other by way of further passages 21 formed between the ring 7, the duct 17 and the manifold 15. For this purpose the ring 7 is formed with a series of circumferentially spaced recesses 22 at one end of the ring 8 and angled to the axis thereof. The blind ends of the radial ducts 17 are closed by a ceramic fibre packing 23 so that gas is prevented from being trapped in the blind ends.

Several, in this case, five, circumferentially spaced semi-conical vanes 24 are formed on the internal surface of the ring 7 to promote turbulence in the air entering the mixing region 10 by way of the first bore end 3.

A pilot burner tube and igniter (not shown) extend radially between the ring 7 and the block 8 through a slot 25 formed therebetween to provide ignition of the gas entering the mixing region 10 from the ducts 17.

The ring 7 and the block 8 are joined to each other by way of a gasket 26 to seal off the gas inlet ducts 17 from the pilot tube, the gasket 26 being provided with suitable apertures 27 to enable the passages 21 to communicate with the ducts 17.

In operation of the device as a burner, fuel gas is supplied through the inlet tube 16 to the manifold 15 and is then distributed by way of the ducts 17 into the mixing chamber 10 which in this mode serves as a fuel gas/air mixing chamber.

Combustion air which preferably is preheated before entering the burner is supplied to the chamber 10 by way of the bore end 3 which in this mode serves as an air inlet. The air is forced to mix with the gas and the gas/air mixture is ignited initially by the pilot burner/igniter which is itself supplied with a premix of fuel gas and cold combustion air. Combustion is substantially completed within the cylindrical section 11 which in this mode serves as a combustion chamber, the mixture entering the chamber 11 past the step 12 which provides means for flame front stabilisation. The products of combustion then leave the burner by way of the second end 4 and can then be supplied to a suitable enclosure such as a furnace.

The burner is constructed so as to produce a high intensity and stable flame by burning fuel gas with an appropriate volume of air which may be preheated to very high temperatures.

The various innovative features in the construction of the burner namely, the body 1 made of a refractory material, the quarl block bore design (the open bore of the cylindrical mixing chamber 10, the conical bore 9, the radiussed outlet 13 and step 12 between the combustion chamber 11 and the mixing chamber 10) provide means for the same burner to operate as a low pressure drop flue for the transfer of hot waste gases from a furnace to a heat recovery system such as a regenerator.

The bore 2 is so designed as to provide a substantially uninterrupted flow path for gas both from the second end 4 to first end 3 as well as in the opposite direction. The fact that the inlet ducts 17 terminate at, rather than in, the bore 2 enhances this effect. Therefore the burner can also serve as a flue for waste gas leaving an enclosure and entering the second end 4 when operated in this mode as well as in a burner mode. When operating as a flue the waste gas then flows through the bore 2 to leave the burner by way of the first end 3 for discharge into a heat regenerator.

Figure 2:
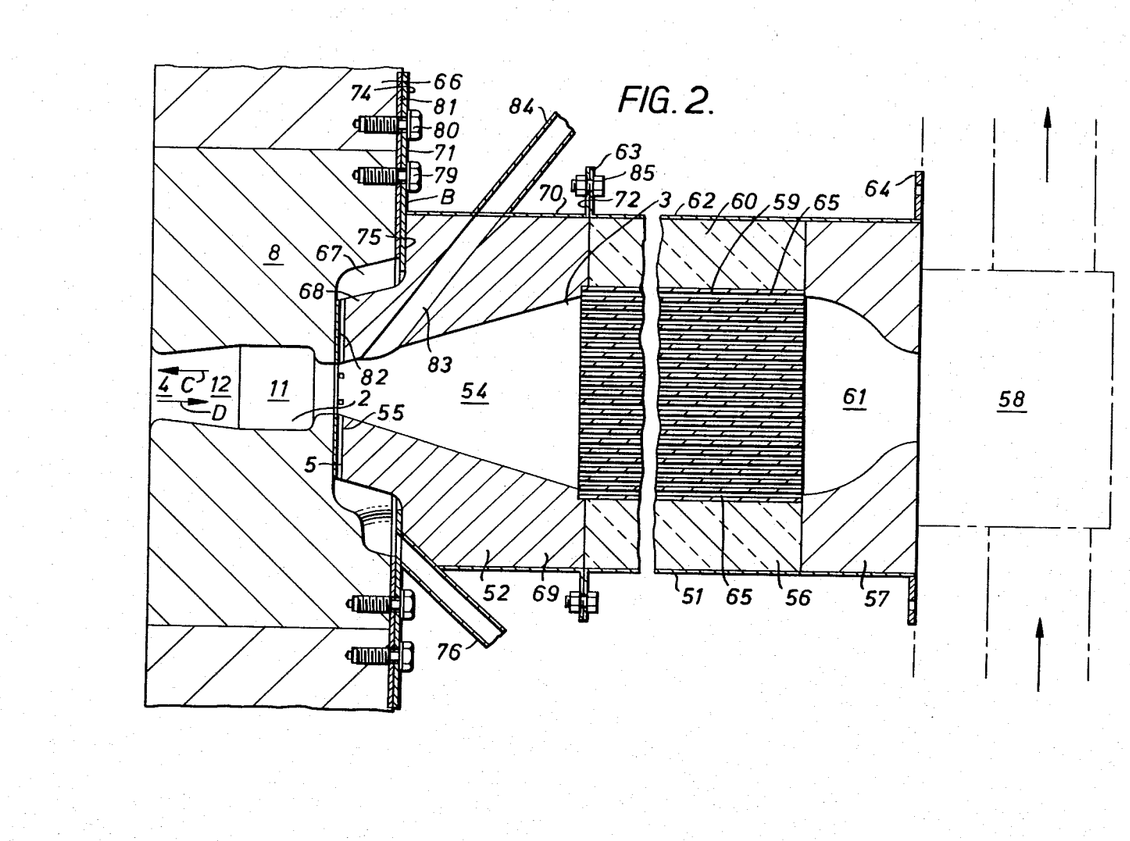
FIG. 2 is a side view in section of the heat regenerator and another form of the burner.

In FIG. 2 the burner B is shown attached to a heat regenerator 51. Burner B is similar to burner A and identical parts bear the same reference numbers.

The burner B comprises a cylindrical block portion 8 similar to that in FIG. 1. The burner also comprises cylindrical refractory block 52 adjoining portion 8 which replaces and performs the same function as the portions 6 and 7 in FIG. 1.

Extending through the portions 8 and 52 is a throughgoing bore 2 which in the portion 8 has identical parts to those shown in the burner of FIG. 1.

The burner portion 52 defines a first end 3 to the bore 2 and a conical portion 54 which tapers to a front end 55 of the block 52.

Formed between the portions 8 and 52 is means 5 for delivering fuel to a point in the bore 2.

The heat regenerator 51 comprises two axially engaging portions 56 and 57, the regenerator 51 communicating with the burner bore 2 at a forward end and a reversing valve 58 at the rearward end. The front portion 56 comprises a cylindrical heat storage bed 59 and a surrounding annular layer 60 of a ceramic fibre insulation material. The rear portion 57 comprises a cylindrical body of refractory having a bore 61 forming a bottle-neck type passage tapering towards the valve 58.

The regenerator portions 56 and 57 are housed in a cylindrical steel shell 62 which is provided at its ends with annular connector flanges 63 and 64. The steel shell provides a gas impermeable lining to prevent the escape of gas through the wall of the regenerator 51.

The heat storage bed 59 comprises a monolithic refractory block through which a multiiplicity of axially aligned gas-carrying channels 65 extend. These channels 65 convey combustion products from the burner portion 52 to the regenerator portion 56 in one mode of operation where the bed is extracting heat from the products for storage. In another mode of operation the channels 65 convey air from the portion 56 to the portion 52 so that the air can be heated by the stored heat now released from the bed.

Alternatively the bed 59 can comprise several adjoining slabs each of which incorporates the gas-carrying channels.

As with the burner shown in FIG. 1, the bore 2 of the burner B forms a substantially uninterrupted flow path for gas in either direction through the bore 2. The burner B can therefore either operate as a burner per se for supplying combustion products to an enclosure such as a furnace or, when operating in another mode, as a flue for receiving waste products from the furnace for discharge to the heat regenerator 51.

To this end the front portion 8 of the burner B is adapted to be fitted into a suitable aperture in the furnace such as the annular portion 66 forming part of the furnace (not shown). The front portion 8 has a recess 67 formed at the end adjacent to the burner portion 52. The front portion 8 has a cylindrical main body portion 69, the neck 68, in use, being received with clearance within the recess.

The main body 69 of the burner portion 52 is housed in a cylindrical steel shell 70 which is provided with connecting flanges 71 and 72 at either end thereof.

Figure 3:
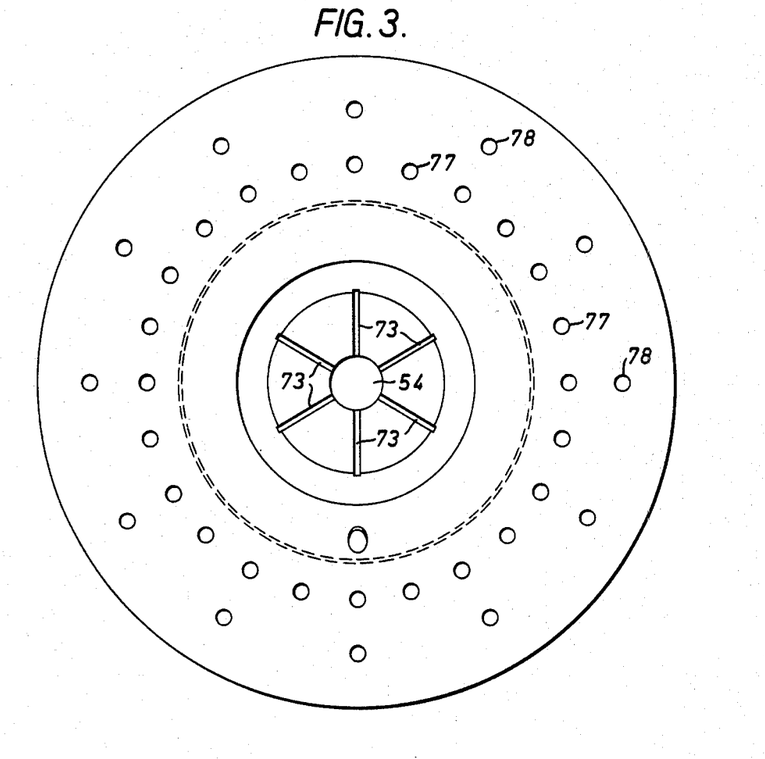
FIG. 3 is a front view of the burner air inlet duct shown in FIG. 2.
Figure 4:
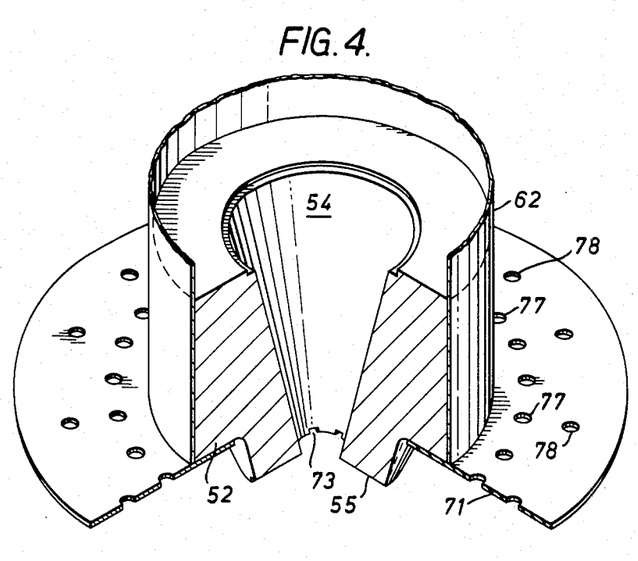
FIG. 4 is a side view in perspective of the inlet duct of FIG. 3 shown partly broken away.

Referring to FIGS. 2 to 4, the neck 68 of the burner portion 52 is formed on its end surface 55 with six radially directed and equi-spaced grooves 73. The flange 71 has a section 74 which extends radially outwardly from the shell 70 and a section 75 which extends radially inwardly therefrom. Extending into the body of the portion 52 at an acute angle to the axis thereof and in the direction of the burner B is a fuel supply duct 76 which terminates at a corresponding aperture in the flange 71. The outer section 74 of the flange 71 is provided with an inner ring 77 of bolt-holes and with an outer ring 78 of fewer bolt-holes. The holes 77 are used to clamp the burner portion 52 to the burner portion 8 by way of bolts 79 while the holes 78 are used to clamp the burner portion 52 to the furnace portion 66 by way of bolts 80.

An annular gasket 81 is provided between the flange 71 and both the burner portion 8 and the furnace portion 66 to form a seal, the gasket 81 being suitably apertured to receive the bolts 79 and 80.

An annular gasket 82 is also mounted between the end face of the burner portion neck 68 and the inner face of the recess 67 in the burner portion 8.

When the burner portion 52 is secured to the burner portion 8 as shown in FIG. 2, the annular clearance 67 forms an annular manifold for receiving fuel gas from the duct 76 and supplying the gas to the grooves 73 which together with the gasket 82 form the fuel inlets 5 to the bore 2.

Extending through the body of the burner portion 52 at an angle to the burner axis is a bore 83 which terminates at one end at the bore 54 and at the other end a tube 84 extends outwardly from the bore 83 and is provided with a sight glass. As shown in FIG. 2, the burner B is clamped to the heat regenerator 51. In this case the burner flange 72 is clamped to the regenerator flange 63 by means of bolts 85. Similarly the regenerator 51 is clamped to the reversing valve 58 by means of flange 64.

The burner B shown in FIGS. 2 to 4 operates in a similar manner to burner A described with reference to FIG. 1.

In one mode of operation when the burner B serves as a burner per se, preheated air is supplied from the regenerator 51 and enters the burner bore 54 where it meets and mixes with fuel gas entering the inlet ducts 5. The fuel gas is combusted in the chamber 11 and enters the furnace in the direction of arrow C.

In the alternate mode of operation when the burner serves as a flue, exhaust combustion products leaving the furnace enter the burner B in the direction of the arrow D. The exhaust gas flows through the burner bore 2 and enters the regenerator 51 which extracts heat from the waste gas for release to the air in the next cycle of operation.

The heat storage bed 65 in the regenerator 51 serves alternately to extract heat from the waste gas passing through it in one direction in one cycle of operation. In the other cycle of operation the bed 65 releases its stored heat to cold air passing through the regenerator 51 in the opposite direction. The burner B and heat regenerator 51 may form part of a conventional heat recovery system such as that shown in FIG. 5.

Figure 5:
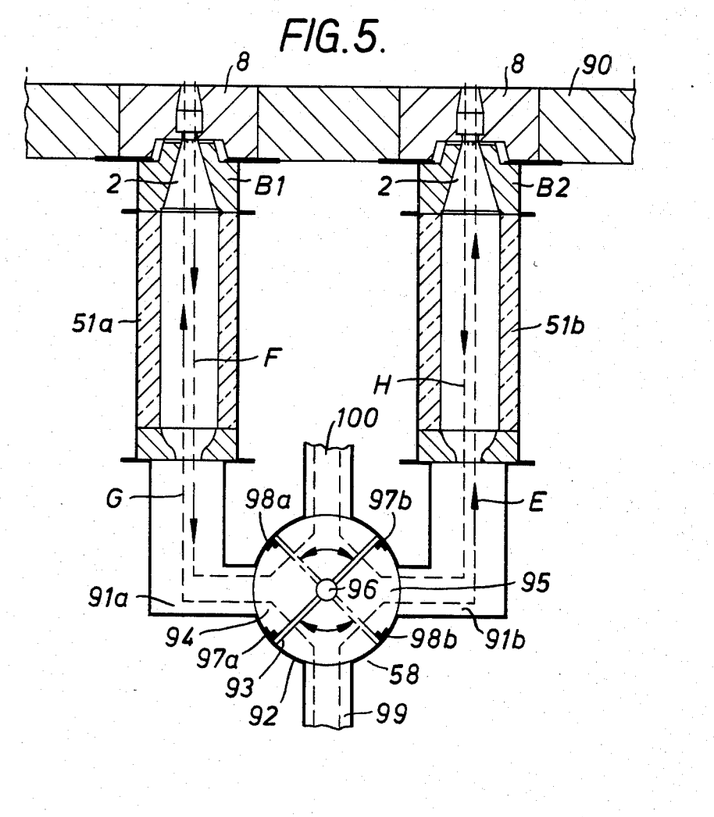
FIG. 5 is a schematic view in section of a heat recovery system incorporating two regenerators and burners shown in FIG. 2 and FIGS. 6 to 8 are schematic views of various alternative arrangements of heat recovery systems incorporating the heat regenerator and burner.

In this case the heat recovery system comprises a pair of burners B1 and B2 and a pair of heat regenerators 51a and 51b, together with a conventional rotating reversing valve 58.

The burners B1 and B2 are mounted side by side on a furnace 90 so that their bores 2 communicate with the interior of the furnace 90.

The regenerator 51a is connected at one end to the burner B1 by the flange connections shown in FIG. 2. Similarly the regenerator 51b is connected at one end to the burner B2 by similar flange connections.

Each of the regenerators 51a and 51b are connected at their other ends to right angled ducts 91a and 91b by means of the flange connections shown in FIG. 2.

The rotary valve 58 comprises a cylindrical housing 92 (the axis of the cylinder extending into the plane of the paper) in which is located a vane 93 which extends axially through the cylinder and divides the housing 92 into two always separate but movable compartments 94 and 95 which are of semi-circular section. The vane 93 is mounted for rotation on a spindle 96 which extends through the housing 92. The vane 93 is rotatable between two positions at 90° to each other as shown in FIG. 5, one position being shown in full line and the other in broken line. The limits to rotation are fixed by two pairs of elongate seals 97a and 97b and 98a and 98b which are secured to the internal surface of the housing 92 with adjacent seals 90° apart.

The vane 93 and the seals 97 and 98 are such that when the vane 93 is engaging one pair of seals the two compartments so formed are sealed from each other.

The ducts 91a and 91b lead respectively to the compartments 94 and 95 and are welded to the valve housing 92.

The housing 92 is also provided with an inlet duct 99 for receiving cold air for combustion and opposite to the duct 99 a hot waste gas outlet duct 100.

The valve 58 is so arranged that when the vane 93 is in one sealing position one duct 91 is connected to the air inlet duct 99 and the other duct 91 is connected to the waste gas outlet duct 100. In the other position when the vane 93 has rotated through an arc of 90° the connections are reversed.

In operation of the system, one of the burners is selected to provide hot gas for the furnace while the other burner serves simultaneously as a flue for discharging the hot waste gas to the regenerator system.

Thus if the burner B1 connected to the regenerator 51a is serving as a flue and the burner B2 connected to the regenerator 51b is providing combusted gas, valve 58 is positioned to connect the regenerator 51b to air inlet duct 99 and to connect the regenerator 51a to the hot waste gas outlet duct 100, the vane 93 being in the full line position of FIG. 5. In this mode cold combustion air enters the duct 99 and the regenerator 51b by way of the valve 58 and the duct 91b. The air then travels up through the regenerator 51b by way of the heat storage bed which will already be heated from previous heat recovery cycles. The now hot air then leaves the regenerator 51b and enters the burner B2 so as to mix with fuel gas entering the burner B2 to provide combusted hot gas for the furnace 90. (see arrows E).

Simultaneously hot waste gas leaves the furnace 90 after use by way of the other burner B1 which in this mode acts as a flue. The waste gas enters the regenerator 51a and travels downwardly through the regenerator 51a by way of the heat storage bed. This bed is thereby heated by the waste gas and serves to store this heat for heating cold combustion air during the next heating cycle. The waste gas then leaves the regenerator 51a and enters the duct 91a before issuing from the outlet duct 100 by way of the valve 58 (see arrows F). After some time, the heat stored in the regenerator 51b will be exhausted and/or the bed in regenerator 51a will have been heated up as much as is possible or desirable. At this stage therefore the heat cycle is reversed by rotating the valve vane 93° by 90° to the position shown in broken line in FIG. 2.

Cold combustion air now enters the burner B1 by way of the inlet duct 99, the valve 58, the duct 91a and the regenerator 51a (see arrows G) and is preheated for the combustion of fuel gas in the burner B1.

Waste gas meanwhile leaves the burner B2 and enters the regenerator 51b to heat the storage bed therein. The waste gas then leaves the regenerator 51b and passes through the duct 91b and the valve 58 before discharge to atmosphere via the outlet duct 100 (see arrows H).

Because the heat regenerator 51 is demountable both from the burner 3 and from the valve means 58 the system is more flexible than a conventional heat recovery system where the regenerator is integral with the burner and the valve means. This flexibility is further improved if the burner is also demountable from the furnace.

The construction of conventional regenerators limits their spacial arrangement to the conventional arrangement where one end (the furnace end) is always vertically above the other end (the valve end). The construction of this regenerator permits any desired arrangement to be achieved. For instance the furnace end could be vertically below the valve end if desired or both ends could be in the same horizontal plane.

Figures 6, 7, 8:
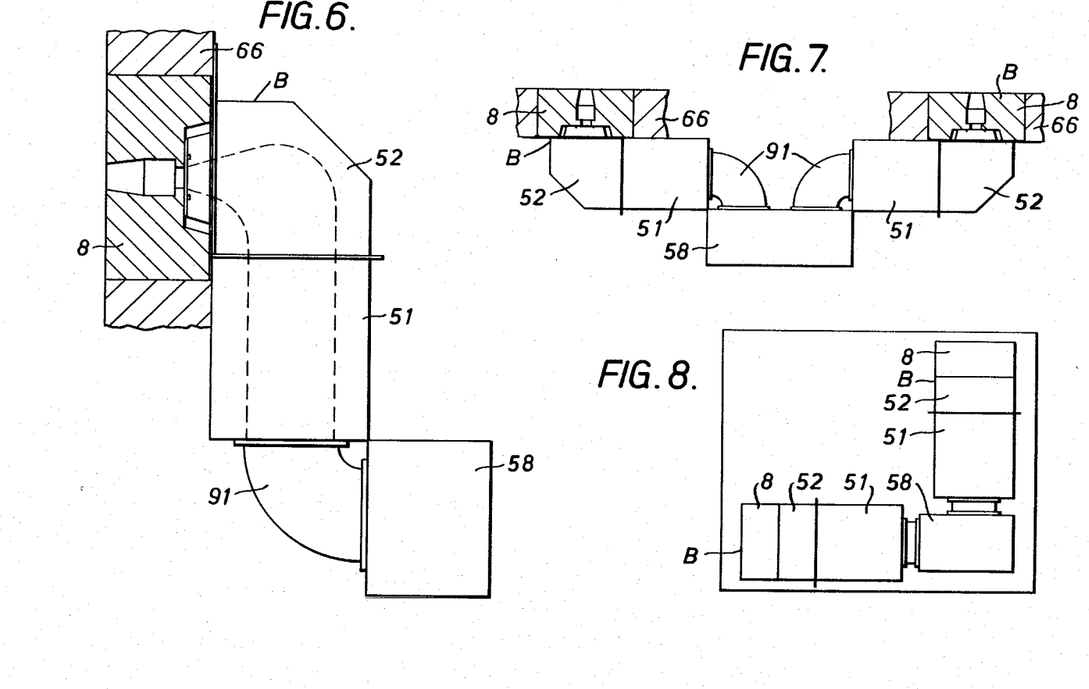

As shown in FIGS. 6 to 8, with this flexible system it is possible to design and install a system to satisfy a whole range of configurational requirements dictated perhaps by space or by heat input or output parameters. It is also possible to vary the configuration and size of the system once installed should any of these parameters by changed for any reason.

We claim:

1. Regenerative heating apparatus for heating an enclosure defined by a wall which has two ports arranged so that while one port is receiving heating gas to heat the enclosure, the other port is discharging the gas as waste gas after heating the enclosure, the apparatus comprising a pair of regenerators arranged so that in use while one is being heated by waste gas the other is preheating air for the combustion of fuel and so that one regenerator communicates with one port while the other regenerator communicates with the other port, each regenerator being provided at one end with a burner for communicating with the one end of the regenerator and with the respective port, each burner having an outlet communicating with a respective port and an inlet to receive fuel for combustion with preheated air supplied by the regenerator to provide heating gas for the enclosure and each burner serving in one mode as a means for supplying the heating gas to the enclosure and in a reverse mode as a flue for discharging waste gas to the regenerator, means for detachably securing the burner to the wall of the enclosure in a position enabling the burner to communicate with its respective port, each regenerator having the other end connected to a single reversing valve operable to connect one of the pair of the regenerators to an outlet for the discharge of the waste gas while simultaneously connecting the other regenerator to an inlet for receiving air for preheating in the other regenerator, the reversing valve being reversible to connect the one regenerator to the inlet and to connect the other regenerator to the outlet, and means for detachably securing the reversing valve to both of the regenerators.

2. Apparatus as claimed in claim 1 further comprising means for detachably securing each burner to the respective one end of its associated regenerator.

3. Apparatus as claimed in claim 1 in which each burner as a portion adapted to fit within its associated port in the wall of the enclosure.

4. Apparatus as claimed in claim 1 in which each regenerator comprises a heat storage bed housed in a fluid impermeable casing.

5. Apparatus as claimed in claim 4 in which the heat storage bed of each regenerator comprises a body of heat resistant material provided with axially aligned channels extending therethrough for the passage of fluid between the ends of the regenerator.

6. Apparatus according to claim 1 wherein each of said burners is constructed and arranged to provide a substantially uninterrupted flow path from its inlet to its outlet as well as in the opposite direction.

7. Apparatus according to claim 6 wherein said burner comprises a cylindrical mixing chamber, a conical inlet bore axially aligned with said mixing chamber and tapering inwardly toward said mixing chamber, a step between the inlet bore and the mixing chamber, and a conical outlet bore axially aligned with said cylindrical mixing chamber and tapering inwardly away from said mixing chamber.

8. Apparatus according to claim 7 wherein the outlet end of said outlet bore is radiussed to form an inwardly tapering section at the outlet end of said outlet bore.

9. Apparatus according to claim 7 wherein said mixing chamber and outlet bore are formed in a single quarl block.

10. Apparatus according to claim 7 further comprising means for supplying fuel gas to said burner, said fuel gas supplying means comprising at least one fuel inlet duct terminating at the surface of said inlet bore.

* * * * *